(12) United States Patent
Shishido et al.

(10) Patent No.: US 9,643,611 B2
(45) Date of Patent: May 9, 2017

(54) CONTROL DEVICE FOR VEHICLE AND DRIVE SYSTEM FOR VEHICLE

(71) Applicants: AISIN SEIKI KABUSHIKI KAISHA, Kariya (JP); ADVICS CO., LTD., Kariya (JP)

(72) Inventors: Yo Shishido, Nisshin (JP); Kyosuke Mori, Kariya (JP); Takeshi Tojo, Kariya (JP); Hiroki Saito, Obu (JP); Masayuki Naito, Nagakute (JP); Takuya Suko, Kariya (JP); Takanori Iida, Nagoya (JP); Takuji Ishimoto, Okazaki (JP)

(73) Assignees: AISIN SEIKI KABUSHIKI KAISHA, Kariya-shi (JP); ADVICS CO., LTD., Kariya (JP)

( * ) Notice: Subject to any disclaimer, the term of this patent is extended or adjusted under 35 U.S.C. 154(b) by 0 days.

(21) Appl. No.: 14/753,581

(22) Filed: Jun. 29, 2015

(65) Prior Publication Data
US 2015/0375747 A1 Dec. 31, 2015

(30) Foreign Application Priority Data

Jun. 30, 2014 (JP) .................................. 2014-134619
Apr. 24, 2015 (JP) .................................. 2015-089837

(51) Int. Cl.
*B60W 30/18* (2012.01)
*B60W 10/04* (2006.01)
(Continued)

(52) U.S. Cl.
CPC ......... *B60W 30/18127* (2013.01); *B60L 7/14* (2013.01); *B60L 15/2009* (2013.01);
(Continued)

(58) Field of Classification Search
CPC ...... B60W 10/08; B60W 10/06; B60W 20/00; B60W 10/02; B60W 20/10; B60W 20/108; B60W 2510/244; B60W 2520/10; B60W 2540/12; Y02T 10/6286; Y02T 10/7077; Y02T 10/6221; Y02T 10/7005;
(Continued)

(56) References Cited

U.S. PATENT DOCUMENTS 6,107,761 A 8/2000 Seto et al.
6,813,553 B2 11/2004 Nakamura et al.
(Continued)

FOREIGN PATENT DOCUMENTS

| JP | 2004-155403 A | 6/2004 |
|---|---|---|
| JP | 2005-280616 A | 10/2005 |
| JP | 2007-246018 A | 9/2007 |
| JP | 2010-83427 A | 4/2010 |
| JP | 2010-183733 A | 8/2010 |
| JP | 2012-17060 A | 1/2012 |

OTHER PUBLICATIONS

Extended European Search Report issued on Nov. 12, 2015 in Patent Application No. 15173798.8.

*Primary Examiner* — Mussa A Shaawat
*Assistant Examiner* — Sanjeev Malhotra
(74) *Attorney, Agent, or Firm* — Oblon, McClelland, Maier & Neustadt, L.L.P.

(57) ABSTRACT

A control signal output unit (a drive control unit) executes control to retain a gear position corresponding to a motor generator during deceleration of a vehicle and regeneration executed by the motor generator.

13 Claims, 10 Drawing Sheets

(51) Int. Cl.
*B60W 10/10* (2012.01)
*B60W 10/18* (2012.01)
*B60L 7/14* (2006.01)
*B60L 15/20* (2006.01)

(52) U.S. Cl.
CPC ............ *B60W 10/04* (2013.01); *B60W 10/10* (2013.01); *B60W 10/18* (2013.01); *B60L 2240/12* (2013.01); *B60L 2240/421* (2013.01); *B60L 2240/423* (2013.01); *Y02T 10/645* (2013.01); *Y02T 10/72* (2013.01); *Y02T 10/7275* (2013.01)

(58) Field of Classification Search
CPC ............ Y02T 10/6217; Y02T 10/6226; Y02T 10/6239; Y02T 10/645; Y02T 10/70; Y02T 10/7044; Y02T 10/705; Y02T 10/7241; Y02T 10/7258; Y02T 10/7275; B60L 11/14; B60L 11/1861; B60L 15/2009; B60L 2210/40; B60L 2240/12; B60L 2240/423; B60L 2240/441; B60L 7/14; B60L 7/18; B60L 7/26; B60K 6/48; B60K 6/365; B60K 6/445; Y10S 903/93
USPC ..................... 701/22; 477/3; 180/65.1, 65.26
See application file for complete search history.

(56) References Cited

U.S. PATENT DOCUMENTS

| | | | |
|---|---|---|---|
| 2002/0061802 A1* | 5/2002 | Chung | B60K 6/365 477/3 |
| 2002/0157882 A1* | 10/2002 | Kubo | B60K 6/28 180/65.26 |
| 2008/0006457 A1* | 1/2008 | Fujimoto | B60W 10/02 180/65.1 |
| 2012/0226402 A1* | 9/2012 | Minamiura | B60T 1/10 701/22 |
| 2013/0311028 A1* | 11/2013 | Ohkuma | B60W 10/06 701/22 |
| 2014/0288748 A1* | 9/2014 | Ideshio | B60K 6/48 701/22 |
| 2014/0303823 A1* | 10/2014 | Nakanishi | B60K 6/48 701/22 |
| 2015/0066271 A1* | 3/2015 | Ogawa | B60L 7/14 701/22 |
| 2015/0120122 A1* | 4/2015 | Sakakibara | B60W 20/10 701/22 |
| 2015/0283920 A1* | 10/2015 | Toyota | B60L 7/14 701/22 |

* cited by examiner

CONTROL DEVICE FOR VEHICLE AND DRIVE SYSTEM FOR VEHICLE

CROSS-REFERENCE TO RELATED APPLICATIONS

The present application claims priority to and incorporates by reference the entire contents of Japanese Patent Application No. 2014-134619 filed in Japan on Jun. 30, 2014 and Japanese Patent Application No. 2015-089837 filed in Japan on Apr. 24, 2015.

BACKGROUND OF THE INVENTION

1. Field of the Invention

The present invention relates to a control device for a vehicle and a drive system for a vehicle.

2. Description of the Related Art

Conventionally, those vehicles have been known each of which includes at least a motor generator as a driving source, and is capable of braking by regeneration executed by the motor generator and braking by a fluid pressure brake. Conventional technologies are described in Japanese Laid-open Patent Publication No. 2004-155403, for example.

In such a vehicle, if a gear position in a multi-speed transmission coupled to the motor generator is shifted to another gear position, the transfer of rotation (torque) between the motor generator and a wheel is temporarily interrupted in the transmission. This operation temporarily stops the braking by regeneration if a gear position in a transmission is shifted to another gear position during the braking by the regeneration executed by the motor generator. As a result, acceleration of the vehicle changes. To solve this problem, the braking by the regeneration may be temporarily shifted to the braking by the fluid pressure brake, for example, in shifting the gear position. The braking by the fluid pressure brake, however, has lower response than that of the braking by the regeneration, which can hardly eliminate fluctuations in the acceleration of the vehicle. It is therefore an object of the present invention to provide a control device for a vehicle and a drive system for a vehicle in which changes in acceleration of the vehicle hardly occur, for example, in shifting a gear position during deceleration of the vehicle and regeneration executed by the motor generator.

SUMMARY OF THE INVENTION

It is an object of the present invention to at least partially solve the problems in the conventional technology.

According to embodiments, a control device for a vehicle that controls: a motor generator that generates torque for driving a vehicle and executes regeneration in which kinetic energy of the vehicle is converted into electrical energy, a multi-speed transmission that transfers torque of the motor generator with a selected gear ratio toward a wheel, and a fluid pressure brake that brakes the vehicle, the control device for a vehicle comprising: a first acquiring unit that acquires speed or speed variation of a vehicle; a second acquiring unit that acquires an operation input for accelerating or decelerating a vehicle; and a drive control unit that controls an operation of the motor generator, shift of a plurality of gear positions in the transmission, and an operation of the brake, wherein the drive control unit executes control to retain the gear position corresponding to the motor generator during deceleration of the vehicle and regeneration executed by the motor generator. This configuration hardly causes changes in the acceleration caused by the shifting of the gear position during the deceleration of the vehicle and the regeneration executed by the motor generator, for example.

In the above control device for a vehicle, for example, the drive control unit executes control to shift the gear position to a lower one in a case where the speed of the vehicle is reduced to a value smaller than a certain threshold while the gear position is retained during deceleration of the vehicle and regeneration executed by the motor generator.

This control is likely to prevent any inconvenience that can be caused if the speed of the vehicle is reduced during the regeneration executed by the motor generator, for example.

In the above control device for a vehicle, for example, the drive control unit executes control to shift the gear position to a lower one in a case where an operation input for starting accelerating the vehicle or an operation input for ending braking the vehicle is acquired while the gear position is retained during deceleration of the vehicle and regeneration executed by the motor generator.

This control is likely to prevent difficulty in acceleration caused by a high gear position when the vehicle starts acceleration, for example.

The above control device for a vehicle further comprises a comparing unit that predicts a deceleration state of the vehicle and compares a first value with a second value, the first value being the kinetic energy regenerated in a case where the gear position in the transmission is retained in the predicted deceleration state of the vehicle, the second value being a sum of kinetic energy lost in shifting the gear position to a lower one and kinetic energy regenerated after shifting the gear position, wherein the drive control unit executes control to shift the gear position to a lower one in spite of deceleration of the vehicle and regeneration executed by the motor generator in a case where the first value is smaller than the second value.

This control is likely to reduce unnecessary energy consumption, for example.

In the above control device for a vehicle, for example, the drive control unit executes control to shift the gear position to a lower one while the regeneration executed by the motor generator is stopped by controlling the motor generator to stop the regeneration and controlling the brake to start braking.

This configuration hardly causes changes in the acceleration caused by the shifting of the gear position during the deceleration of the vehicle and the regeneration executed by the motor generator.

In the above control device for a vehicle, for example, the drive control unit executes control regenerative braking torque by the motor generator so as to vary a rate of change per time of regenerative braking torque by the motor generator within a range of a value equal to or smaller than a certain value.

This control can prevent sudden changes in the regenerative braking torque, for example.

In the above control device for a vehicle, for example, the drive control unit controls the regenerative braking torque to decrease as the time elapses until the motor generator stops the regeneration and controls the regenerative braking torque to decrease depending on a vehicle speed difference between a present vehicle speed and a vehicle speed at stopping the regeneration during the decrease of the regenerative braking torque.

This control can prevent sudden changes in the required regenerative torque by defining the required regenerative torque corresponding to the vehicle speed difference, for example.

In the above control device for a vehicle, for example, a first control unit in the drive control unit is provided in a brake unit, the first control unit controlling regenerative braking torque by the motor generator.

This configuration allows the response or other characteristics of the brake unit or a brake to be reflected on the control of the regenerative braking torque more readily or more accurately, for example.

In the above control device for a vehicle, for example, the drive control unit executes control to shift the gear position to a lower one in a case where an operation input for ending accelerating the vehicle or an operation input for starting braking the vehicle is acquired.

The gear position corresponding to the motor generator can be shifted before end of acceleration of the vehicle, start of the braking (decelerating) of the vehicle, and start of the regeneration executed by the motor generator, for example. This operation can eliminate the necessity of shifting the gear position during the deceleration of the vehicle and the regeneration executed by the motor generator. This configuration hardly causes changes in the acceleration caused by the shifting of the gear position during the deceleration of the vehicle and the regeneration executed by the motor generator.

In the above control device for a vehicle, for example, the drive control unit executes control to shift the gear position to a lower one in a case where an operation input for reducing braking force of the vehicle is acquired.

This control is likely to prevent difficulty in acceleration caused by a high gear position when the vehicle starts acceleration, for example.

According to embodiments, a drive system for a vehicle, the drive system comprising: a motor generator that generates torque for driving a vehicle and executes regeneration in which kinetic energy of the vehicle is converted into electrical energy; a multi-speed transmission that transfers rotation of the motor generator with a selected gear ratio toward a wheel; a fluid pressure brake that brakes the vehicle; and a control device that controls an operation of the motor generator, shift of a plurality of gear positions in the transmission, and an operation of the brake, the control device comprising: a first acquiring unit that acquires speed or speed variation of a vehicle; a second acquiring unit that acquires an operation input for accelerating or decelerating a vehicle; and a drive control unit that executes control to retain the gear position corresponding to the motor generator during deceleration of the vehicle and regeneration executed by the motor generator.

This configuration hardly causes changes in the acceleration caused by the shifting of the gear position during the deceleration of the vehicle and the regeneration executed by the motor generator, for example.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
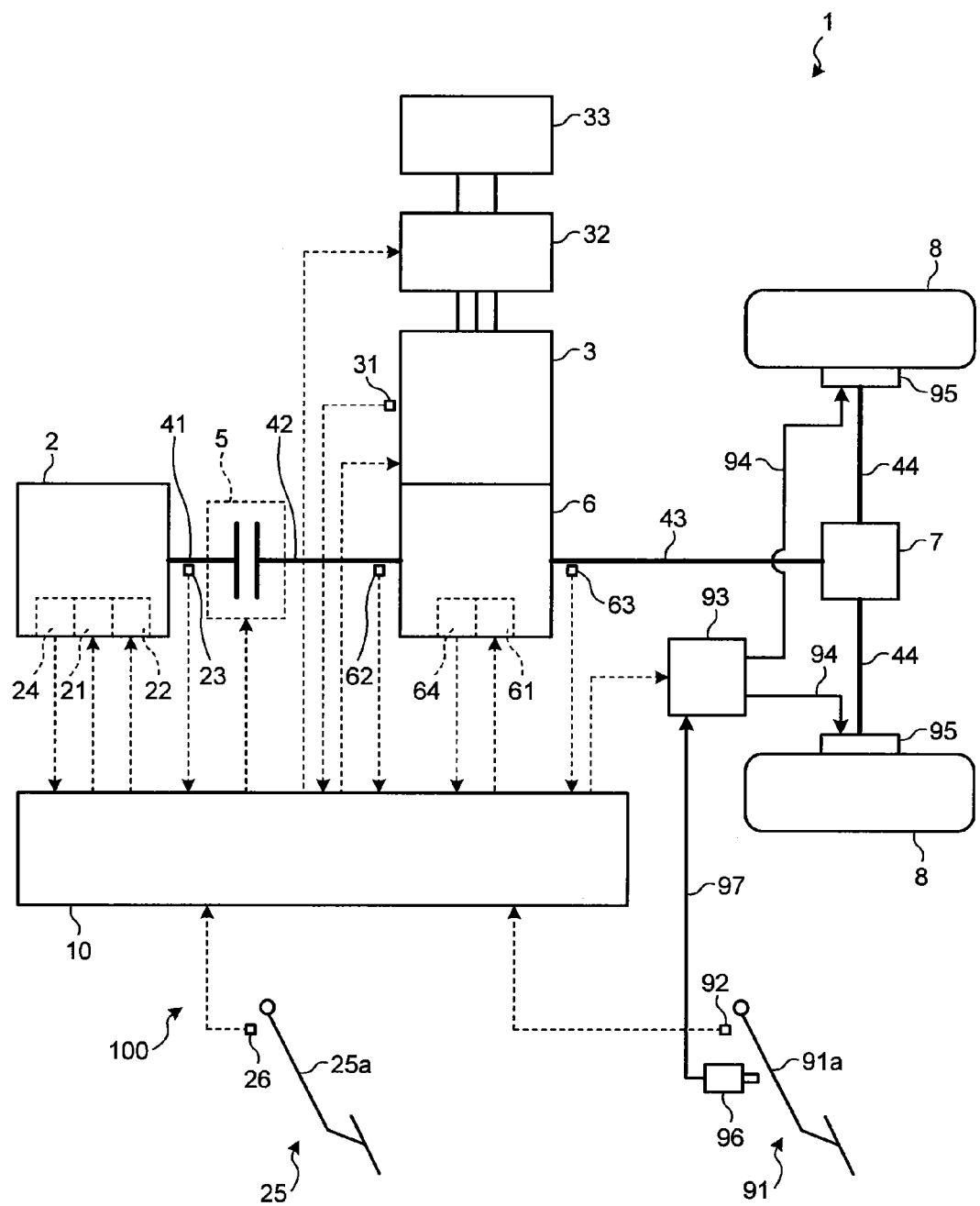
FIG. 1 is an outline diagram illustrating the configuration for a vehicle including a control device for a vehicle and a drive system for a vehicle according to embodiments.

Exemplary embodiments according to the present invention are disclosed hereinafter. The configuration of the embodiments and the operations and consequences (advantageous effects) resulting therefrom are provided merely for exemplary purpose and not limiting. The present invention can be also achieved with configurations other than the configurations in the embodiments disclosed herein. Various advantageous effects resulting from the basic configurations of the embodiments can be also achieved including secondary advantageous effects. A plurality of embodiments hereinafter include similar components and units. In the descriptions below, components identical to the components that have already been described are designated by reference numerals identical to those of the components that have already been described, and an overlapped explanation thereof may be omitted.

First Embodiment

In a first embodiment, as illustrated in FIG. 1, a vehicle 1 (e.g., a four-wheeled vehicle) is what is called a hybrid vehicle including an engine 2 and a motor generator 3 each serving as a driving source. In the vehicle 1, the torque (rotation) of the engine 2 or the motor generator 3 is transferred to wheels 8 through a shaft 41, a clutch 5, a shaft 42, a transmission 6, a shaft 43, a differential gear 7, and a shaft 44, for example. While the vehicle 1 is a rear-wheel-drive vehicle in the present embodiment, the vehicle 1 may be a front-wheel-drive vehicle or a four-wheel-drive vehicle (an all-wheel-drive vehicle) instead. A system 100 includes a control device 10, sensors 23, 24, 26, 31, 62 to 64, and 92, a power control unit 32, a brake unit 93, and a brake 95. The control device 10 is an example of a control device for a vehicle, whereas the system 100 is an example of a drive system for a vehicle. The vehicle 1 is an automobile including the motor generator 3 and may be in another form (e.g., an electric vehicle without an engine).

The engine 2 (an internal combustion engine) is a port injection engine or a cylinder injection engine (a direct-injection engine), for example, and uses fuels such as gasoline, light oil, alcohol, and hydrogen. The engine 2 is controlled by the control device 10. The control device 10 controls the opening degree of a throttle valve 21 of the engine 2 and the injection quantity of a fuel injection valve 22, thereby controlling the torque (engine torque) and the rotational speed (the number of rotations) of the engine 2, for example. The control device 10 is capable of controlling the engine 2 to reach a target engine torque. Corresponding to the shaft 41 provided on the output side of the engine 2, a sensor 23 (e.g., a rotational-speed sensor) is provided for detecting the rotational speed of the shaft 41. In the engine 2, a sensor 24 (e.g., an air flow meter) is provided for detecting the flow rate of intake air. The control device 10 is capable of acquiring the rotational speed (the number of rotations, the output rotational speed, the number of output rotations) of the engine 2 based on a signal received from the sensor 23. The rotational speed of the engine 2 may also be acquired based on the rotational speed of other components (e.g., a shaft). The control device 10 may receive data representing the rotational speed from the sensor 23. The control device 10 is also capable of acquiring the flow rate of intake air of the engine 2 based on a signal received from the sensor 24. The control device 10 may receive data representing the flow rate of intake air from the sensor 24. The engine 2 may include other sensors or actuators.

The motor generator 3 (a rotary electric machine) is a three-phase motor generator driven by the power control unit 32. The power control unit 32 includes a boost converter that boosts the voltage of a direct current of a battery 33, and an inverter (a three-phase bridge circuit) that converts the direct current boosted by the boost converter into a three-phase alternating current. The power control unit 32 supplies the motor generator 3 with alternating current (AC) power for generating torque. The power control unit 32 converts the AC power regenerated by the motor generator 3 from rotation (torque) into direct current (DC) power and supplies the DC power to the battery 33 (a capacitor) (i.e., stores electricity or charges the battery). The control device 10 controls the power control unit 32 to control the torque generated by the motor generator 3, the rotational speed, and the torque (energy) regenerated by the motor generator 3. Corresponding to a shaft (not illustrated) provided on the output side of the motor generator 3, a sensor 31 (e.g., a rotational-speed sensor) is provided for detecting the rotational speed of the shaft. The control device 10 is capable of acquiring the rotational speed (the number of rotations, the output rotational speed, the number of output rotations) of the motor generator 3 based on a signal received from the sensor 31. The control device 10 may receive data representing the rotational speed of the motor generator 3 from the sensor 31. The motor generator 3 may include other sensors or actuators.

The brake 95 is provided to each of the wheels 8 and slows down the rotation of the corresponding wheel 8, thereby braking (decelerating) the vehicle 1. The brake 95 is a fluid pressure brake and operates by fluid pressure (liquid pressure, hydraulic pressure, pneumatic pressure) transferred from the brake unit 93 (a hydraulic unit, an actuator) through a pipe line, a hose, and a path 94 for a fluid (a working fluid, a working oil, working air) formed in a block. The brake 95 is an example of a disc brake and a drum brake, and includes a cylinder and friction elements (e.g., a drum, a disc, a shoe, and a pad). The brake unit 93 includes a solenoid valve or a relief valve and serves as an anti-lock brake system (ABS) unit. The control device 10 controls the brake unit 93 to control the braking torque of the brake 95.

The control device 10 changes the torque, the rotational speed, and the like of the engine 2 or the motor generator 3 depending on the displacement (the position, the stroke, the manipulated variable) of a movable member 25a (e.g., an arm) of an operating unit 25 (e.g., an accelerator pedal) through which an accelerating instruction for the vehicle 1 is input. Corresponding to the movable member 25a, a sensor 26 is provided for detecting the displacement of the movable member 25a. The control device 10 receives information on the displacement of the movable member 25a based on a signal received from the sensor 26. The control device 10 may receive data representing the displacement of the movable member 25a from the sensor 26.

The control device 10 changes the braking of the motor generator 3 or the brake 95 depending on the displacement (the position, the stroke, the manipulated variable) of a movable member 91a (e.g., an arm) of an operating unit 91 (e.g., a brake pedal) through which a braking (decelerating) instruction for the vehicle 1 is input. Corresponding to the movable member 91a, a sensor 92 (e.g., a displacement sensor) is provided for detecting the displacement of the movable member 91a. The control device 10 receives information on the displacement of the movable member 91a based on a signal received from the sensor 92. The control device 10 may receive data representing the displacement of the movable member 91a from the sensor 92. Corresponding to the movable member 91a, a cylinder 96 (a master cylinder) is provided. The fluid pressure generated in the cylinder 96 in response to the displacement of the movable member 91a is transferred to the brake unit 93 through a fluid path 97. The cylinder 96 is capable of providing the reaction force of manipulation of the movable member 91a in a normal state and generating the fluid pressure to operate the brake 95 in an abnormal state.

The clutch 5 is a dry-single-plate clutch, for example. The clutch 5 is in one of the following states: a connected state (a transfer state) in which torque (rotation) is transferred from the shaft 41 to the shaft 42; a disconnected state (a non-transfer state) in which no torque is transferred from the shaft 41 to the shaft 42; and a semi-clutch state in which the shaft 41 and the shaft 42 slide with each other. In the clutch 5, the sliding state of the rotating members opposed to each other varies, whereby the transfer state (the transmissibility, the degree of transfer) of the torque (the rotation) transferred from the shaft 41 to the shaft 42 varies.

The transmission 6 (a gearbox) in the present embodiment is a multiple-speed transmission having gear pairs corresponding to respective speeds (shift speeds). Each of the gear pairs includes a first driving gear (not illustrated) or a second driving gear (not illustrated), and a driven gear. The first driving gear is rotatable linked with the shaft 42 (a first input shaft). The second driving gear is rotatable linked with an output shaft (a second input shaft, not illustrated) of the motor generator 3. The driven gear is rotatable linked with the shaft 43 (an output shaft). The gear pairs have different gear ratios (the transmission gear ratios) from each other. In the transmission 6, one of the gear pairs is selectively effected. That is, the driving gear of the selected gear pair rotates integrally with the input shaft and then the driven gear meshed with the driving gear rotates integrally with the output shaft. The rotational speed of the input shaft changes (increases or decreases) to the rotational speed corresponding to the gear ratio of the selected gear pair. That is, the rotational speed of the shaft 43 is defined depending on the rotational speed of the shaft 42 or the motor generator 3, and (the gear ratio of) the selected gear pair. In the transmission 6, a plurality of gear positions are defined between the motor generator 3 and the wheels 8, and also between the engine 2 and the wheels 8.

In the present embodiment, the transmission 6 is an automated manual transmission (AMT) in which an actuator 61 switches the shift speeds (the gear ratios, the gear positions) based on an electric signal. That is, the transmission 6 includes at least one actuator 61 (e.g., a linear actuator, a motor, a transfer mechanism, a driving mechanism) that switches the effective gear pairs. The actuator 61 moves, for example, a movable member (a connecting member, e.g., a dog clutch, not illustrated) that switches the linked state and the separated (independent) state. In the linked state, the input shaft or the output shaft rotates integrally with the corresponding driving gear or driven gear. In the separated (independent) state, the input shaft or the output shaft is not associated with the corresponding driving gear or driven gear in the rotational direction. The control device 10 controls the actuator 61 to move the movable member, thereby switching the shift speeds (the gear ratios, the gear positions) of the transmission 6. Sensors 62 and 63 are provided for detecting the rotational speed (the number of rotations) of the shafts 42 and 43 corresponding to the input shaft of the transmission 6 and the shaft 43 provided on a later position relative to the output shaft (nearer to the wheels 8) of the transmission 6, respectively. The control device 10 is capable of acquiring the rotational speed (the number of rotations) of the shafts 42 and 43 based on signals received from the sensors 62 and 63, respectively. The control device 10 may receive data representing the rotational speed from the sensors 62 and 63.

The control device 10 is also capable of acquiring information on the starting of a shift operation or information on the ending of a shift operation, for example, in addition to the gear pair (the gear position) being selected or to be selected in the transmission 6 based on a signal received from the sensor 64 (e.g., a shift sensor) provided to the transmission 6. The control device 10 may receive data representing the gear position and the instruction of the starting of a shift operation or the ending of a shift operation from the sensor 64.

The control device 10 is an electronic control unit (ECU), for example. The ECU includes a micro controller unit (MCU), a power circuit, a driver (a controller), an input/output conversion circuit, an input/output protection circuit (which are not illustrated). The ECU includes electronic components (not illustrated) implemented on a circuit board that is housed in a case (not illustrated). The MCU includes a central processing unit (CPU), a main storage (a memory), an auxiliary storage, an interface (an input/output device), a communication device, and a bus (which are not illustrated). The main storage is a read only memory (ROM) and a random access memory (RAM), for example. The auxiliary storage is a flash memory, for example. The control device 10 can include an engine ECU serving as an ECU for the engine 2, a motor generator ECU serving as an ECU for the motor generator 3, a transmission ECU serving as an ECU for the transmission 6, and a brake ECU serving as an ECU for the brake 95. The control device 10 can be an integrated ECU in which those ECUs are integrated. Alternatively, the control device 10 can be a superior ECU that unifies those ECUs. In the MCU, the CPU can execute arithmetic processing according to a computer program installed in the main storage and the like and control individual components of the engine 2 and the like.

Figure 2:
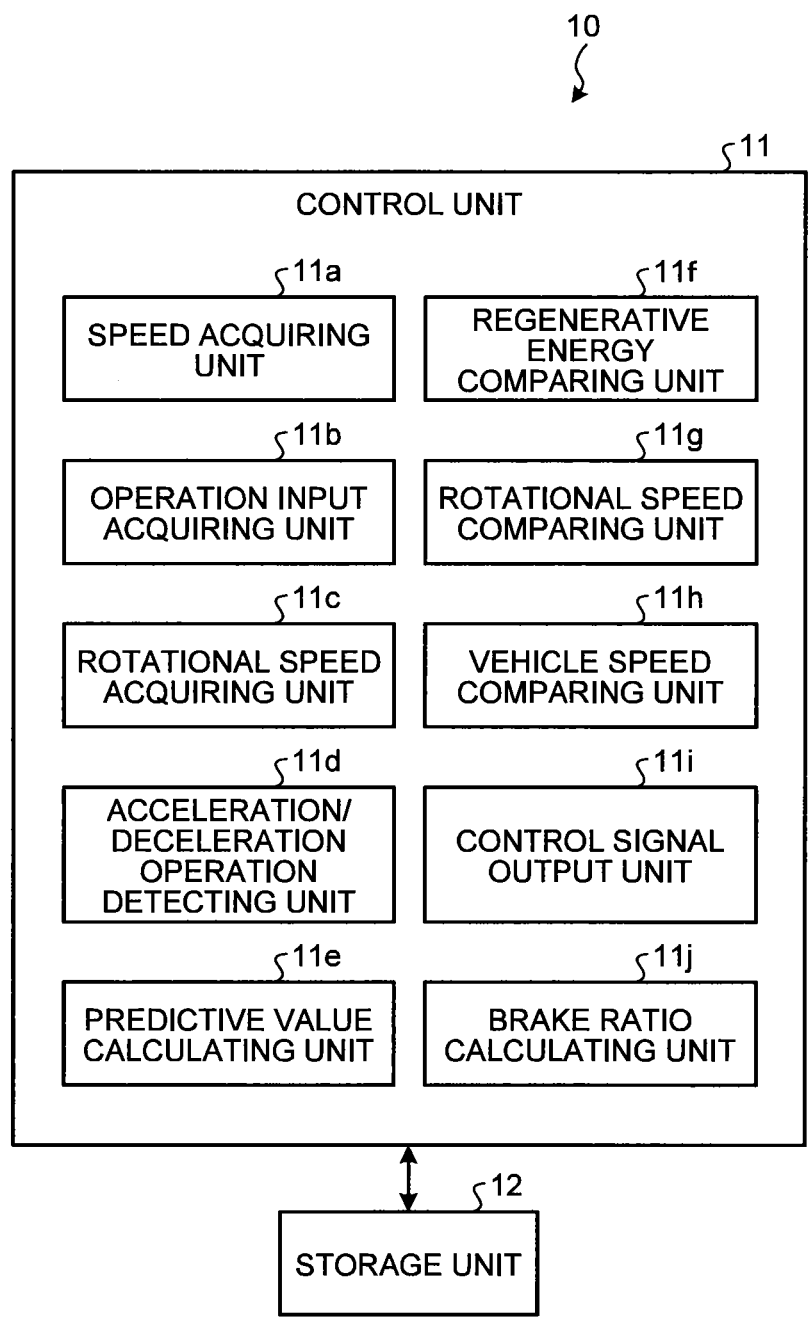
FIG. 2 is a functional block diagram illustrating the control device for a vehicle according to the embodiments.

The following describes an exemplary process of control executed by a control unit 11 (the control device 10) on the transmission 6 (the actuator 61), the motor generator 3 (the power control unit 32), and the brake 95 (the brake unit 93) during deceleration, with reference to FIGS. 2 to 5. As illustrated in FIG. 2, the control device 10 includes the control unit 11 (e.g., a CPU) and a storage unit 12 (e.g., an auxiliary storage). As illustrated in FIG. 2, the control unit 11 can function (operate) as the following components: a speed acquiring unit 11a; an operation input acquiring unit 11b, a rotational speed acquiring unit 11c, an acceleration/deceleration operation detecting unit 11d, a predictive value calculating unit 11e, a regenerative energy comparing unit 11f, a rotational speed comparing unit 11g, a vehicle speed comparing unit 11h, a control signal output unit 11i, and a brake ratio calculating unit 11j, for example, through hardware in cooperation with software (computer programs). That is, the computer programs can include modules corresponding to the respective blocks, for example, in the control unit 11 illustrated in FIG. 2. The speed acquiring unit 11a acquires the speed or the speed variation of the vehicle 1. The speed acquiring unit 11a is capable of acquiring the speed of the vehicle 1, for example, based on the rotational speed of the shaft 43. The operation input acquiring unit 11b acquires an operation input for accelerating or decelerating the vehicle 1. The operation input acquiring unit 11b is capable of acquiring the operation input through the movable member 25a of the operating unit 25 or the operation input through the movable member 91a of the operating unit 91, for example. The rotational speed acquiring unit 11c acquires the rotational speed of the motor generator 3. The speed acquiring unit 11a is an example of a first acquiring unit. The operation input acquiring unit 11b is an example of a second acquiring unit. The control signal output unit 11i is an example of a drive control unit.

The acceleration/deceleration operation detecting unit 11d detects operation inputs corresponding to start of deceleration, end of deceleration, start of acceleration, and end of acceleration based on the data acquired by the operation input acquiring unit 11b. For example, the acceleration/deceleration operation detecting unit 11d can detect an operation input corresponding to the start of deceleration or the end of deceleration based on the displacement of the movable member 91a or the variation (the speed of change) of the displacement of the movable member 91a. The acceleration/deceleration operation detecting unit 11d can detect an operation input corresponding to the start of acceleration or the end of acceleration based on the displacement of the movable member 25a or the variation (the speed of change) of the displacement of the movable member 25a. The acceleration/deceleration operation detecting unit 11d can detect the operation input corresponding to the end of acceleration as the operation input corresponding to the start of deceleration, and detect the operation input corresponding to the start of acceleration as the operation input corresponding to the end of deceleration.

If the gear position corresponding to the motor generator 3 (the gear position interposed between the motor generator 3 and the wheels 8) is retained (i.e., without shifting the gear) during deceleration of the vehicle 1 and regeneration executed by the motor generator 3, the predictive value calculating unit 11e calculates the following values: the deceleration variation with time of the vehicle 1, the torque variation with time of the motor generator 3, and the kinetic energy regenerated depending on the torque variation with time (or electrical energy acquired through the regeneration). If the gear position is shifted to a lower one (a gear position with a larger gear ratio) corresponding to the motor generator 3 (i.e., the gears have been changed) during deceleration of the vehicle 1 and regeneration executed by the motor generator 3, the predictive value calculating unit 11e can calculate the following values: the deceleration variation with time of the vehicle 1, the time required for shifting to each gear position, the torque variation with time of the motor generator 3 at each gear position, the kinetic energy lost (cannot be regenerated) depending on the torque variation with time, and the kinetic energy regenerated depending on the torque variation with time, for example. The predictive value calculating unit 11e can predict (estimate) the deceleration of the vehicle 1 based on the displacement of the movable member 91a in the operating unit 91, the speed of change (the rate of change) of the displacement, or the road surface state, for example. The predictive value calculating unit 11e can acquire the time required for shifting to each gear position from the storage unit 12. The time required for shifting to each gear position may be a predetermined value or may be a learning value based on an actual value.

Figure 3:
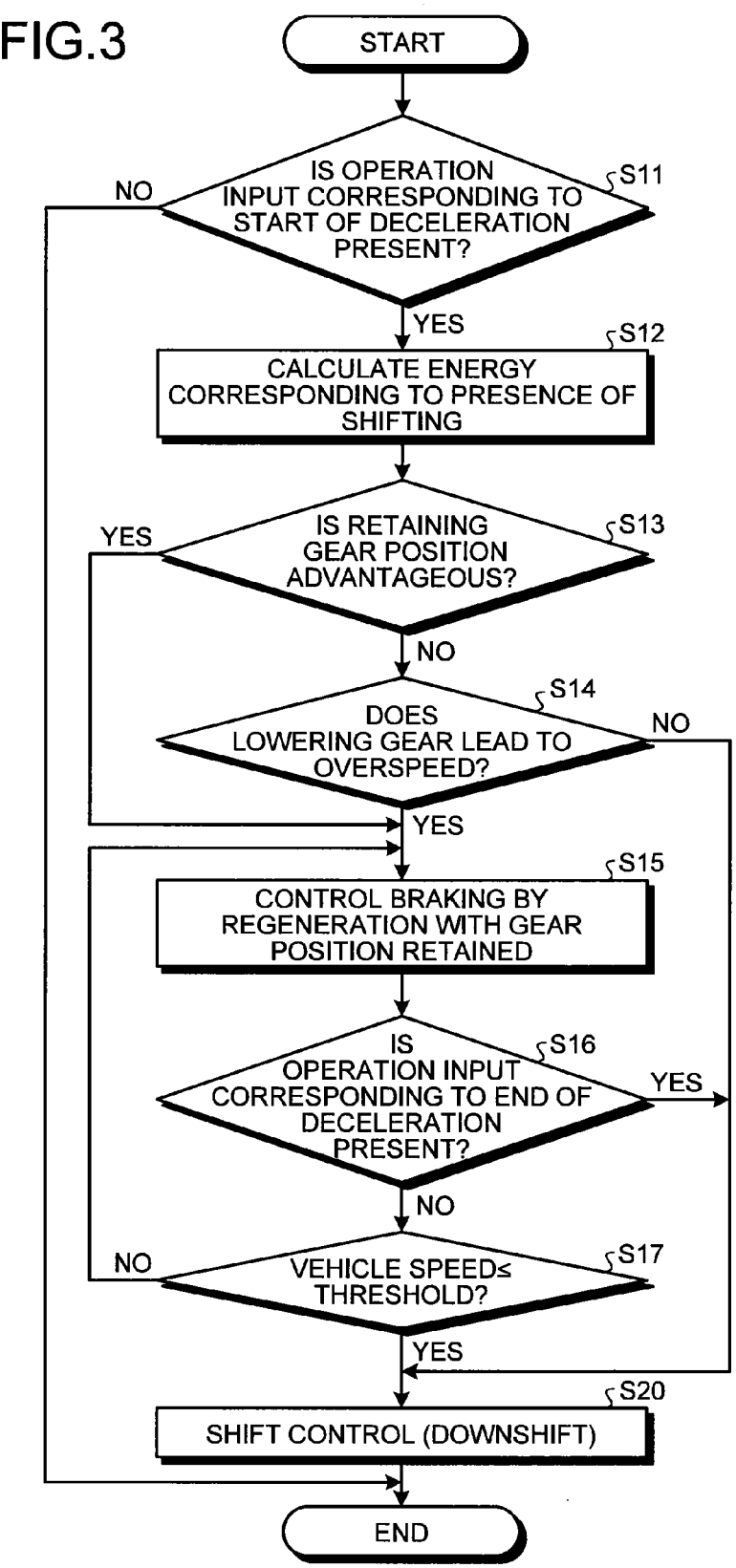
FIG. 3 is a flowchart illustrating a process of control executed by the control device for a vehicle according to a first embodiment.

As illustrated in FIG. 3, firstly, the control unit 11 functions as the acceleration/deceleration operation detecting unit 11d to detect the presence of an operation input corresponding to the start of deceleration or the end of acceleration in the operating unit 25 or 91 (S11). If the operation input corresponding to the start of deceleration (the end of acceleration) is detected at S11 (Yes at S11), the control unit 11 functions as the predictive value calculating unit 11e to calculate the following predictive values: the predictive value of the kinetic energy regenerated by the motor generator 3 if the vehicle 1 is decelerated without shifting the gear (i.e., the gear position corresponding to the motor generator 3 is retained) (the predictive value of the regenerative energy without gearshift, a first value); and the predictive value of the sum of the kinetic energy lost if the gear is shifted (if the gear position corresponding to the motor generator 3 is shifted to a lower one) and the vehicle 1 is decelerated, and the kinetic energy regenerated by the motor generator 3 (the predictive value of the regenerative energy with gearshift, a second value) (S12). If No is selected at S11, the control according to the flowchart illustrated in FIG. 3 is not executed.

Subsequently, the control unit 11 functions as the regenerative energy comparing unit 11f (a comparing unit) to compare the predictive value of the regenerative energy without gearshift with the predictive value of the regenerative energy with gearshift (S13). If deceleration while retaining the gear position is advantageous at S13, that is, if the predictive value of the regenerative energy without gearshift is equal to or larger than the predictive value of the regenerative energy with gearshift (Yes at S13), the control unit 11 functions as the control signal output unit 11i to output a control signal to the components so as to brake (decelerate) the vehicle 1 through the regeneration executed by the motor generator 3 with the gear position being retained (S15). By contrast, if No is selected at S13, the control unit 11 functions as the rotational speed comparing unit 11g to acquire the rotational speed of the motor generator 3 (the rotational speed after shifting the gear) when the gear position is shifted to a lower one. The rotational speed after shifting the gear can be calculated based on the rotational speed of the motor generator 3 in the present gear position and the gear ratio between the present gear position and the lower gear position. The rotational speed comparing unit 11g compares the rotational speed after shifting the gear with a certain threshold (S14). The threshold is the rotational speed corresponding to an overspeed of the motor generator 3. If the rotational speed after shifting the gear is equal to or larger than the threshold, that is, if lowering the gear position leads to the overspeed (Yes at S14), the control unit 11 functions as the control signal output unit 11i to output a control signal to the components so as to brake (decelerate) the vehicle 1 through the regeneration executed by the motor generator 3 with the gear position being retained (S15). If No is selected at S14, the processing at S20 is executed.

The gear position corresponding to the motor generator 3 is defined based on the range of the rotational speed of the motor generator 3. The storage unit 12 stores data representing the gear position corresponding to the rotational speed of the motor generator 3 or the speed of the vehicle 1, for example. Unless the condition for S15 is met, the control unit 11 acquires data representing the gear position corresponding to the rotational speed of the motor generator 3 with reference to the storage unit 12. The control unit 11 then controls the transmission 6 to achieve the defined gear position. In other words, at S15, the control unit 11 (the control signal output unit 11i, the drive control unit) retains the gear position without shifting the gear even if the rotational speed of the motor generator 3 reaches the value at which the gear position is shifted to another gear position in other states (e.g., the state in which the vehicle 1 is in acceleration, the motor generator 3 does not execute regeneration although the vehicle 1 is in deceleration, or the like).

At S15, the control unit 11 functions as the acceleration/deceleration operation detecting unit 11d to detect the presence of an operation input corresponding to the end of deceleration or the start of acceleration in the operating unit 25 or 91 (S16). If the operation input corresponding to the end of deceleration (the start of acceleration) is detected at S16 (Yes at S16), the control unit 11 functions as the control signal output unit 11i to output a control signal to the components so as to lower the gear position (S20). By contrast, if No is selected at S16, the control unit 11 functions as the vehicle speed comparing unit 11h to compare the present value of the vehicle speed with a threshold (S17). The threshold is larger than the maximum vehicle speed for the regeneration executed by the motor generator 3. If the threshold is reached, a brake-switching control (refer to S22 in FIG. 5) starts in the regeneration state. In the brake-switching control, the braking by the regeneration executed by the motor generator 3 is replaced with the braking by the brake 95. The maximum vehicle speed is the maximum value in a low-speed range of the vehicle 1 in which the regeneration is not executed by the motor generator 3. If Yes is selected at S17, the control unit 11 also functions as the control signal output unit 11i to output a control signal to the components so as to lower the gear position (S20). Although the vehicle speed represents the speed of the vehicle 1, in actual control, the speed of the vehicle 1 may be substituted with another corresponding parameter such as the rotational speed of the wheels 8 or the rotational speed of the shaft 43. In this case, the threshold is defined based on the parameter used for calculating the vehicle speed. If No is selected at S17, the process returns to S15.

Figure 4:
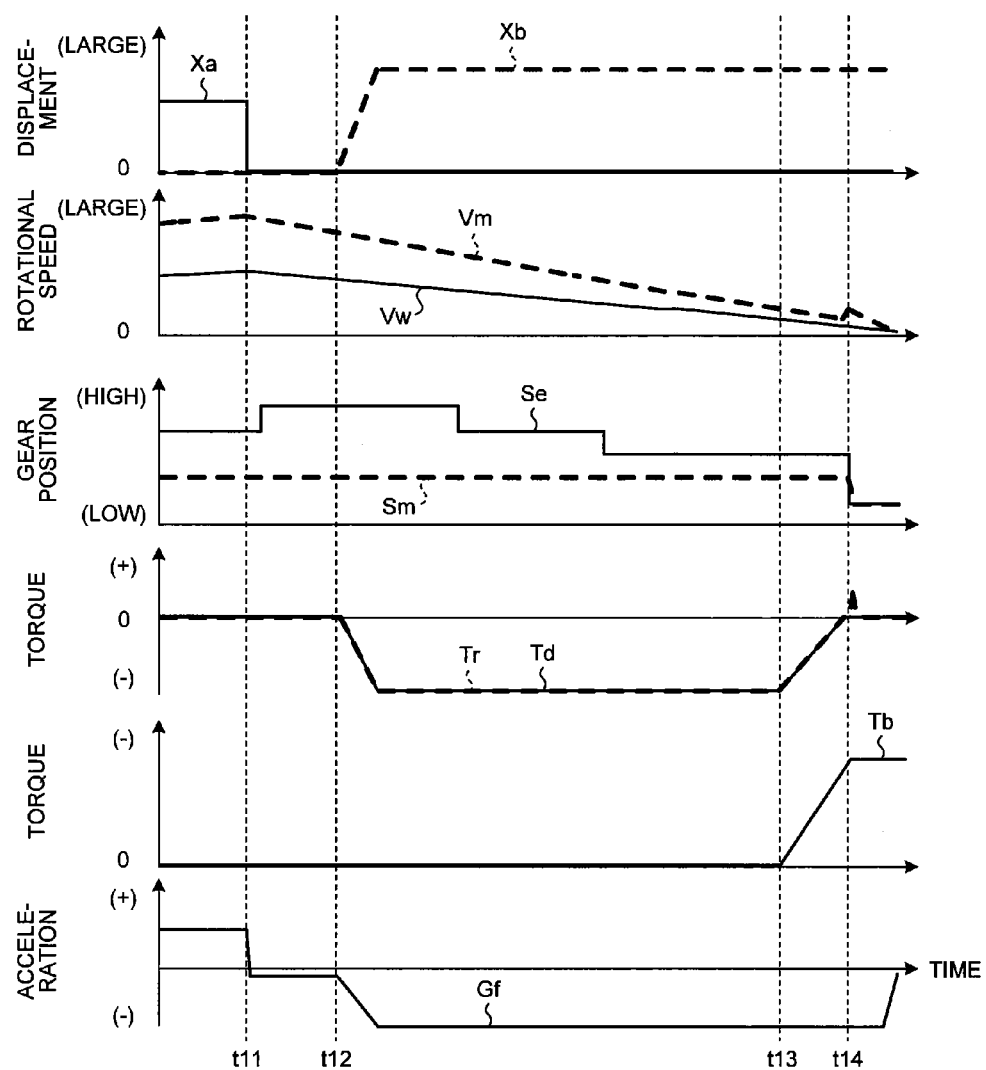
FIG. 4 is a group of exemplary timing charts illustrating parameters that vary with time after control is executed by the control device for a vehicle according to the first embodiment.

FIG. 4 illustrates exemplary timing charts when the control according to the flowchart in FIG. 3 is executed. FIG. 4 illustrates exemplary variations with time of the following parameters: the displacement Xa of the movable member 25a of the operating unit 25, a displacement Xb of the movable member 91a of the operating unit 91, a rotational speed Vw of the wheels 8, a rotational speed Vm of the motor generator 3, a gear position Se corresponding to the engine 2 in the transmission 6 (that is, the gear position interposed between the engine 2 and the wheels 8), a gear position Sm corresponding to the motor generator 3 in the transmission 6 (that is, the gear position interposed between the motor generator 3 and the wheels 8), a required torque Td for the motor generator 3, an actual torque Tr of the motor generator 3, a braking torque Tb by the brake 95, and acceleration Gf in the front-back direction of the vehicle. The abscissa axis in FIG. 4 represents time.

The acceleration/deceleration operation detecting unit 11d detects an operation input corresponding to the end of acceleration or the start of deceleration at a time t11 and a time t12 (S11 illustrated in FIG. 3). After the time t12, the control signal output unit 11i outputs a control signal to the components so as to reduce the numbers of rotations of the engine 2 and the motor generator 3 in response to the operation for decelerating the vehicle 1 detected by the acceleration/deceleration operation detecting unit 11d (the displacement of the movable member 91a of the operating unit 91). In the example illustrated in FIG. 4, retaining the gear position Sm corresponding to the motor generator 3 is advantageous at S13 in FIG. 3, that is, the predictive value of the regenerative energy without gearshift, which is calculated at S12, is equal to or larger than the predictive value of the regenerative energy with gearshift (Yes at S13), and the control signal output unit 11i therefore outputs a control signal to the components so as to brake the vehicle 1 through the regeneration executed by the motor generator 3 with the gear position Sm being retained (S15). At S15, the control signal output unit 11i outputs a control signal to control the transmission 6 to sequentially shift the gear position Se corresponding to the engine 2 to a lower one as the time elapses. That is, in this example, during deceleration of the vehicle 1 and regeneration executed by the motor generator 3, the gear position Se corresponding to the engine 2 is sequentially shifted to the gear position Se corresponding to the vehicle speed (the rotational speed Vw of the wheels 8). This operation facilitates setting of the gear position Se corresponding to the engine 2 more appropriately and promptly when the vehicle 1 starts acceleration.

At a time t13, the vehicle speed Vw reaches the threshold (Yes at S16), and then the shifting control (downshift) is started (S20). Specifically, from the time t13 to a time t14, the torque Tr (positive torque) by the motor generator 3 gradually increases as well as the braking torque Tb (negative torque) by the brake 95 gradually increasing. That is, the control signal output unit 11i controls the components so as to decrease the ratio of the braking by the regeneration executed by the motor generator 3 as well as increasing the ratio of the braking by the brake 95. At the time t13, if the vehicle speed reaches the maximum vehicle speed and the ratio of the braking by the regeneration executed by the motor generator 3 becomes 0, the control signal output unit 11i outputs a signal to control the transmission 6 to shift the gear position Sm corresponding to the motor generator 3 to a lower gear position Sm. After the time t12 through the time t13, as illustrated in FIG. 4, the gear position Sm is retained without shifting the gear, thereby reducing the fluctuations in the torque of the motor generator 3. This effect also reduces the fluctuations in the acceleration Gf associated with the shifting of the gear, for example, and enables the motor generator 3 to regenerate the kinetic energy of the vehicle 1 more efficiently.

Figure 5:
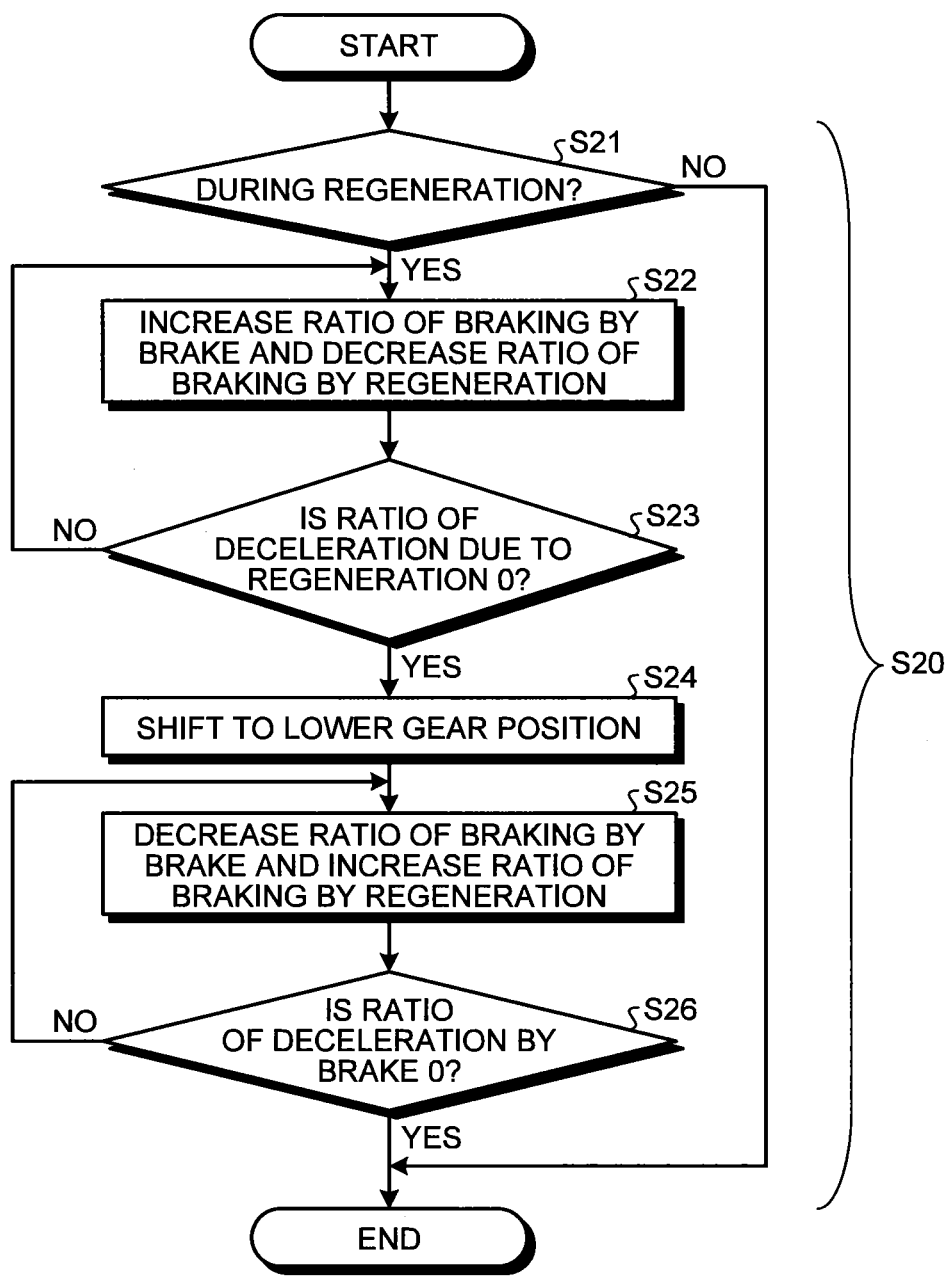
FIG. 5 is a flowchart illustrating a process of shifting control (downshift control) executed by the control device for a vehicle according to the first embodiment.

The following describes in detail the shifting control (downshift) executed at S20 illustrated in FIG. 3 with reference to FIG. 5. The shifting control is executed while the motor generator 3 executes regeneration. That is, if the motor generator 3 is executing regeneration (Yes at S21), the control unit 11 functions as the control signal output unit 11i to output a control signal to the components so as to decrease the ratio of the braking by the regeneration executed by the motor generator 3 as well as increasing the ratio of the braking by the brake 95 (S22). At S22, the braking of the vehicle 1 by the motor generator 3 is replaced with the braking by the brake 95. If No is selected at S21, the control according to the flowchart illustrated in FIG. 5 is not executed.

Subsequently, the control unit 11 functions as the brake ratio calculating unit 11j to calculate at least one of the ratio of the braking by the brake 95 and the ratio of the braking by the regeneration executed by the motor generator 3 in the braking of the vehicle 1 (S23). If the ratio of the braking by the regeneration executed by the motor generator 3 becomes 0 (zero or substantially 0) (Yes at S23), the control signal output unit 11i outputs a signal to control the transmission 6 to shift the gear ratio Sm corresponding to the motor generator 3 to a lower gear position Sm (S24). If No is selected at S23, the process returns to S22.

After the processing at S24 ends, the control unit 11 functions as the control signal output unit 11i to output a control signal to the components so as to gradually increase the ratio of the braking by the regeneration executed by the motor generator 3 as well as gradually decreasing the ratio of the braking by the brake 95 (S25). At S25, the braking of the vehicle 1 by the brake 95 is replaced with the braking by the motor generator 3.

Subsequently, the control unit 11 functions as the brake ratio calculating unit 11j to calculate at least one of the ratio of the braking by the brake 95 and the ratio of the braking by the regeneration executed by the motor generator 3 in the braking of the vehicle 1 (S26). If the ratio of the braking by the brake 95 becomes 0 (zero or substantially 0) (Yes at S26), the processing ends. If No is selected at S26, the process returns to S25.

As described above, in the present embodiment, the control signal output unit 11i (the drive control unit) executes control to retain the gear position corresponding to the motor generator 3 during the deceleration of the vehicle 1 and the regeneration executed by the motor generator 3, for example. In this manner, the present embodiment hardly causes changes in the acceleration caused by the shifting of the gear position during the deceleration of the vehicle 1 and the regeneration executed by the motor generator 3, for example.

In the present embodiment, while control is executed to retain the gear position corresponding to the motor generator 3 during the deceleration of the vehicle 1 and the regeneration executed by the motor generator 3 and if the speed of the vehicle 1 decreases to a value smaller than a certain threshold, for example, the control signal output unit 11i executes control to shift the gear position to a lower one. This control according to the present embodiment is likely to prevent any inconvenience that can be caused if the speed of the vehicle 1 decreases during the regeneration executed by the motor generator 3.

In the present embodiment, while control is executed to retain the gear position corresponding to the motor generator 3 during the deceleration of the vehicle 1 and the regeneration executed by the motor generator 3 and if an operation input for starting accelerating the vehicle 1 or an operation input for ending braking the vehicle 1 is received, for example, the control signal output unit 11i executes control to shift the gear position to a lower one. This control is likely to prevent difficulty in acceleration caused by a high gear position when the vehicle 1 starts acceleration, for example.

As described above, in the present embodiment, the control signal output unit 11i executes control to shift the gear position corresponding to the motor generator 3 to a lower one in spite of the deceleration of the vehicle 1 and the regeneration executed by the motor generator 3 if the predictive value of the regenerative energy without gearshift (the first value) is smaller than the predictive value of the regenerative energy with gearshift (the second value), for example. This control according to the present embodiment is likely to reduce unnecessary energy consumption, for example.

In the present embodiment, when the control signal output unit 11i executes control to shift the gear position corresponding to the motor generator 3 to a lower one, for example, the control signal output unit 11i controls the motor generator 3 to stop the regeneration and controls the brake 95 to start braking. That is, the control signal output unit 11i executes control to shift the gear position to a lower one while the regeneration executed by the motor generator 3 is stopped. When the gear position corresponding to the motor generator 3 is shifted during deceleration, for example, the regeneration executed by the motor generator 3 is stopped. This configuration hardly causes changes in the acceleration caused by the shifting of the gear position during the deceleration of the vehicle 1 and the regeneration executed by the motor generator 3.

Second Embodiment

The configuration and the control (the processing) according to a second embodiment are the same as those in the first embodiment excluding the following difference: the predictive value of the regenerative energy without gearshift is not compared with the predictive value of the regenerative energy with gearshift. That is, comparing the following two predictive values (the process from S12 to S14 illustrated in FIG. 3) executed in the first embodiment is not executed: the predictive value of the kinetic energy regenerated by the motor generator if the vehicle is decelerated without shifting the gear (the predictive value of the regenerative energy without gearshift, the first value); and the predictive value of the sum of the kinetic energy lost if the gear is shifted and the vehicle is decelerated, and the kinetic energy regenerated by the motor generator (the predictive value of the regenerative energy with gearshift, the second value). Also in the present embodiment, operations and advantageous effects similar to those in the first embodiment can be achieved based on the configuration and control similar to those in the first embodiment.

Figure 6:
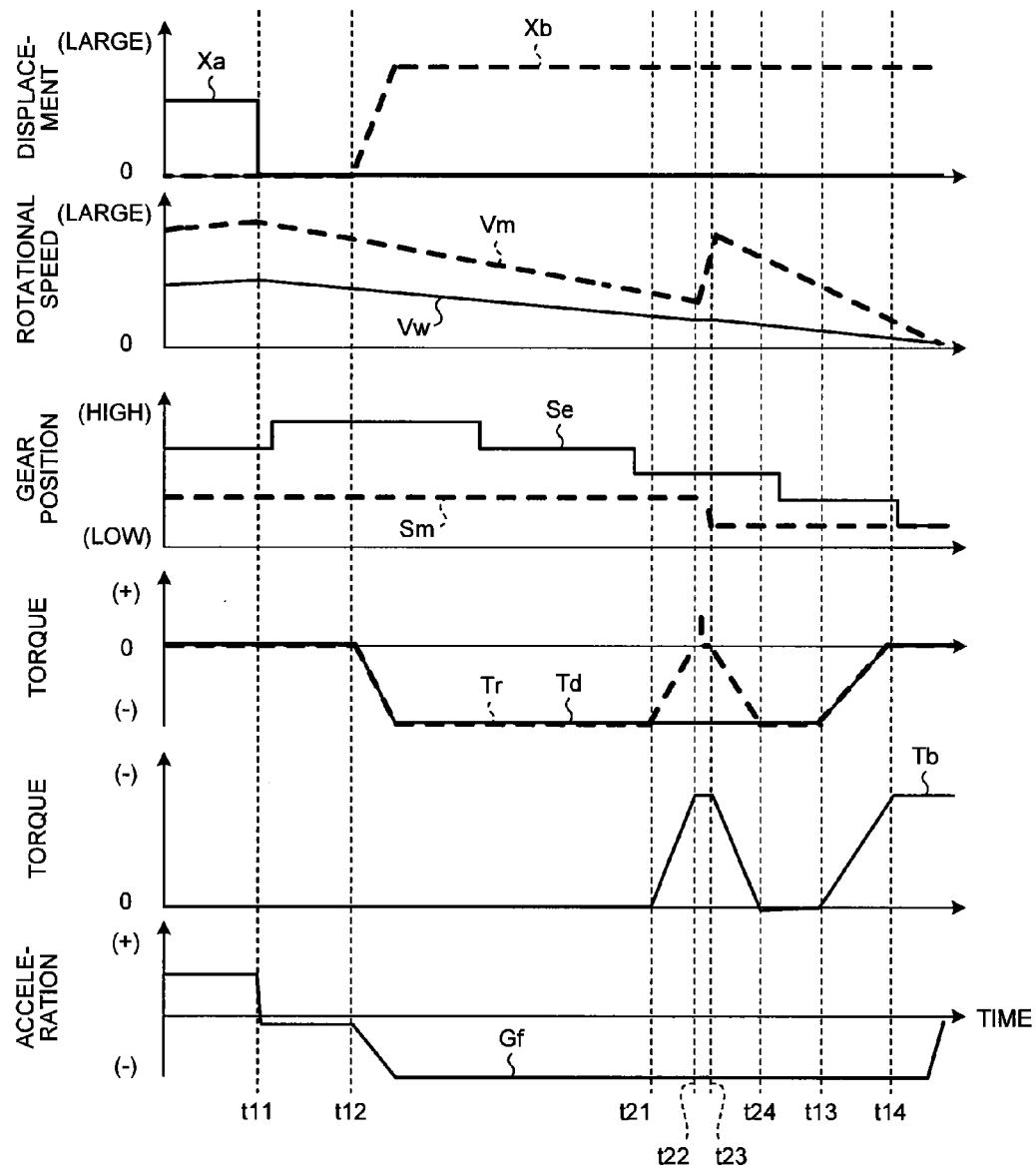
FIG. 6 is a group of exemplary timing charts illustrating parameters that vary with time during regeneration by a motor generator after shifting control (downshift control) is executed by a control device for a vehicle according to a second embodiment.

FIG. 6 illustrates timing charts when the gear position corresponding to the motor generator 3 is shifted to a lower one during the deceleration of the vehicle 1 and the regeneration executed by the motor generator 3. FIG. 6 illustrates exemplary variation with time of the parameters similar to those illustrated in FIG. 4. In the present embodiment, the process from the time t11 through the time t12 to the time t21 is the same as the process illustrated in FIG. 4 according to the first embodiment. At the time t21, the processing illustrated in FIG. 5 is executed. That is, at the time t21, if the motor generator 3 is executing regeneration (Yes at S21 in FIG. 5), the control unit 11 functions as the control signal output unit 11i to output a control signal to the components so as to gradually reduce the ratio of the braking by the regeneration executed by the motor generator 3 as well as gradually increasing the ratio of the braking by the brake 95 from the time t21 to the time t22 (S22).

Subsequently, the control unit 11 functions as the brake ratio calculating unit 11j to calculate at least one of the ratio of the braking by the brake 95 and the ratio of the braking by the regeneration executed by the motor generator 3 in the braking of the vehicle 1 (S23). If the ratio of the braking by the regeneration executed by the motor generator 3 becomes 0 (zero or substantially 0) (Yes at S23) at the time t22, the control signal output unit 11i controls the transmission 6 to shift the gear ratio Sm corresponding to the motor generator 3 to a lower gear position Sm from the time t22 to the time t23 (S24). If No is selected at S23, the process returns to S22.

After the processing at S24 ends at the time t23, the control unit 11 functions as the control signal output unit 11i to output a control signal to the components so as to gradually increase the ratio of the braking by the regeneration executed by the motor generator 3 as well as gradually decreasing the ratio of the braking by the brake 95 from the time t23 to the time t24 (S25). At S25, the braking of the vehicle 1 by the brake 95 is replaced with the braking by the motor generator 3. After the time t24, the process is the same as the process illustrated in FIG. 4.

According to the present embodiment, the sum of the braking torque due to the regeneration executed by the motor generator 3 and the braking torque by the brake 95 remains constant in both the period from the time t21 to the time t22 and the period from the time t23 to the time t24. In this manner, the present embodiment hardly causes changes in the acceleration caused by the shifting of the gear position during the deceleration of the vehicle 1 and the regeneration executed by the motor generator 3, for example.

Third Embodiment

In the first and the second embodiments, before the shifting of the gear position corresponding to the motor generator 3, the braking by the regeneration executed by the motor generator 3 is shifted to the braking by the fluid pressure brake 95. By contrast, in a third embodiment, before the braking by the regeneration executed by the motor generator 3 is applied, the gear position corresponding to the motor generator 3 is shifted. Except for this feature, the configuration and the control (the processing) according to the present embodiment are the same as those in the first or the second embodiment. Also in the present embodiment, operations and advantageous effects similar to those in the first or the second embodiment can be achieved based on the configuration and control similar to those in the first or the second embodiment.

Figure 7:
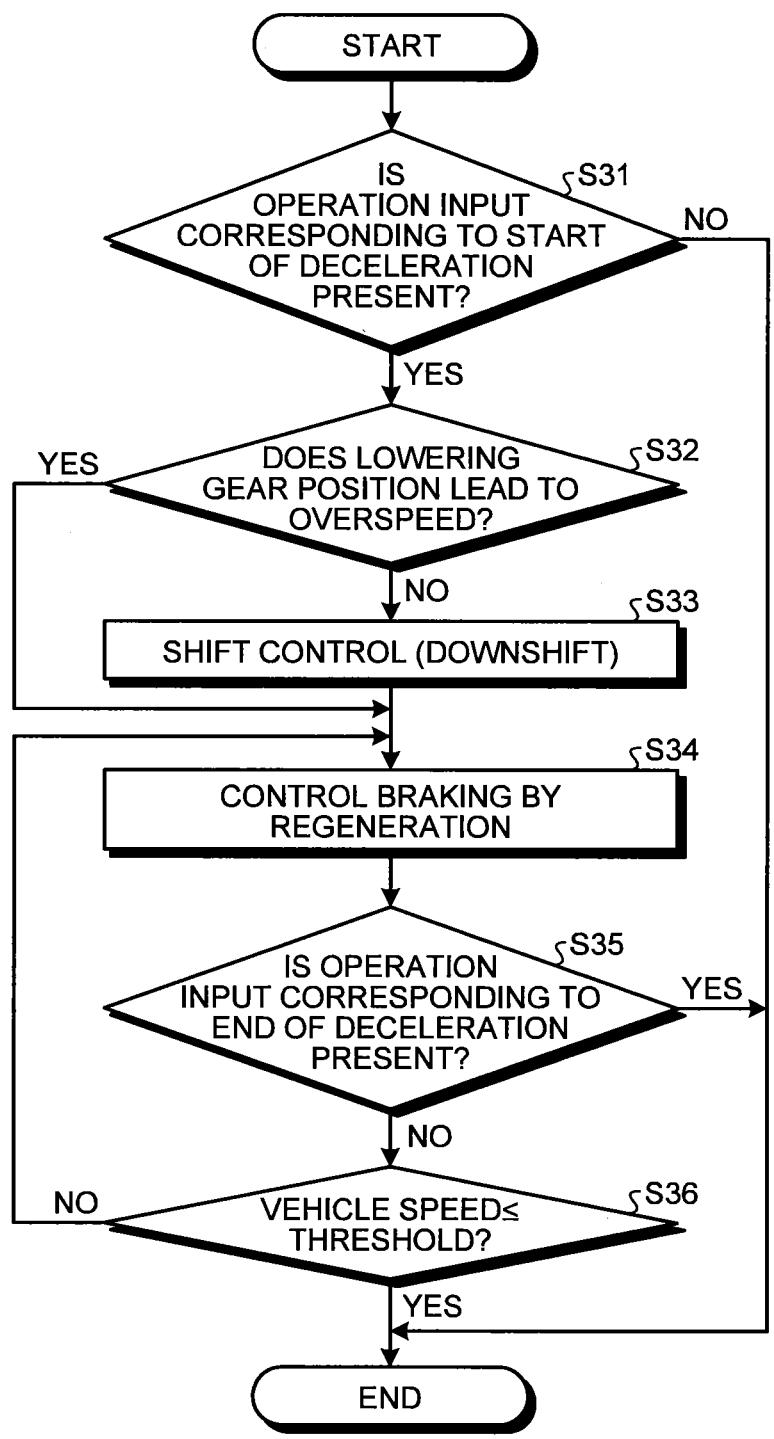
FIG. 7 is a flowchart illustrating a process of control executed by a control device for a vehicle according to a third embodiment.

As illustrated in FIG. 7, firstly, the control unit 11 functions as the acceleration/deceleration operation detecting unit 11d to detect the presence of an operation input corresponding to the start of deceleration or the end of acceleration in the operating unit 25 or 91 (S31). The processing at S31 is the same as that at S11 illustrated in FIG. 3. If No is selected at S31, the control according to the flowchart illustrated in FIG. 7 is not executed.

If Yes is selected at S31, the control unit 11 functions as the rotational speed comparing unit 11g to acquire the rotational speed of the motor generator 3 (the rotational speed after shifting the gear) when the gear position is shifted to a lower one. The rotational speed comparing unit 11g compares the rotational speed after shifting the gear with a certain threshold (S32). The processing at S32 is the same as that at S14 illustrated in FIG. 3. If the rotational speed after shifting the gear is smaller than the threshold (No at S32), the control unit 11 functions as the control signal output unit 11i to output a control signal to the components so as to lower the gear position (S33). The processing at S33 is the same as that at S20 illustrated in FIG. 3.

After the processing at S33, the control unit 11 functions as the control signal output unit 11i to output a control signal to the components so that regeneration by the motor generator 3 brakes the vehicle 1 (S34). If No is selected at S32, the processing at S34 is executed, instead of the processing at S33. During the processing at S34, the control unit 11 functions as the acceleration/deceleration operation detecting unit 11d to detect the presence of an operation input corresponding to the end of deceleration or the start of acceleration in the operating unit 25 or 91 (S35). The processing at S35 is the same as that at S16 illustrated in FIG. 3. If the operation input corresponding to the end of deceleration (the start of acceleration) is detected at S35 (Yes at S35), the control according to the flowchart illustrated in FIG. 7 ends. If No is selected at S35, the control unit 11 functions as the vehicle speed comparing unit 11h to compare the present value of the vehicle speed with the threshold (S36). The processing at S36 is the same as that at S17 illustrated in FIG. 3. If No is selected at S36, the process returns to S34. If Yes is selected at S36, the control according to the flowchart illustrated in FIG. 7 ends.

As described above, in the present embodiment, the control signal output unit 11i (the drive control unit) executes control to shift the gear position corresponding to the motor generator 3 to a lower one, if an operation input for ending accelerating the vehicle 1 or an operation input for starting braking the vehicle 1 is received, for example. According to the present embodiment, the gear position corresponding to the motor generator 3 can be shifted before end of acceleration of the vehicle 1, start of the braking (decelerating) of the vehicle 1, and start of the regeneration executed by the motor generator 3, for example. This operation can eliminate the necessity of shifting the gear position during the deceleration of the vehicle 1 and the regeneration executed by the motor generator 3. This configuration hardly causes changes in the acceleration caused by the shifting of the gear position during the deceleration of the vehicle 1 and the regeneration executed by the motor generator 3. Also in the present embodiment, the motor generator 3 can execute regeneration more efficiently in a still lower gear position.

Fourth Embodiment

Figure 8:
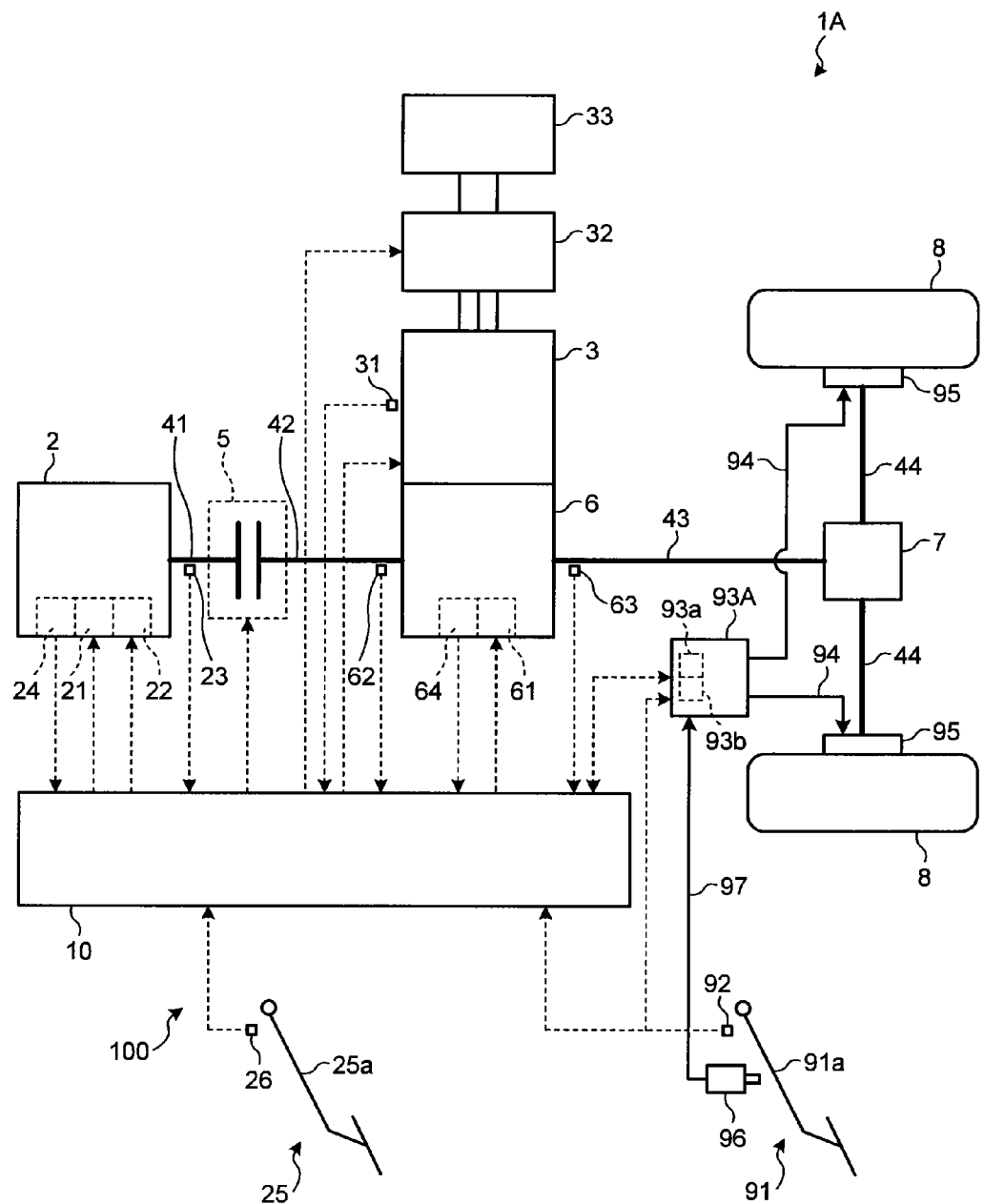
FIG. 8 is an outline diagram illustrating the configuration of a vehicle including a control device for a vehicle and a drive system for a vehicle according to a fourth embodiment.

In a vehicle 1A according to a fourth embodiment illustrated in FIG. 8, a control unit 93a provided in a brake unit 93A executes at least a part of the shifting control (S20 in FIGS. 3 and 5) same as that in the above-described embodiments or the brake-switching control (S22 in FIG. 5). This configuration allows the response or other characteristics of the brake unit 93A or the brake 95 to be reflected on the shifting control, the brake-switching control (control of the regenerative braking torque), or the like, more readily or more accurately. The control unit 93a is an example of the drive control unit or a first control unit.

Figure 9:
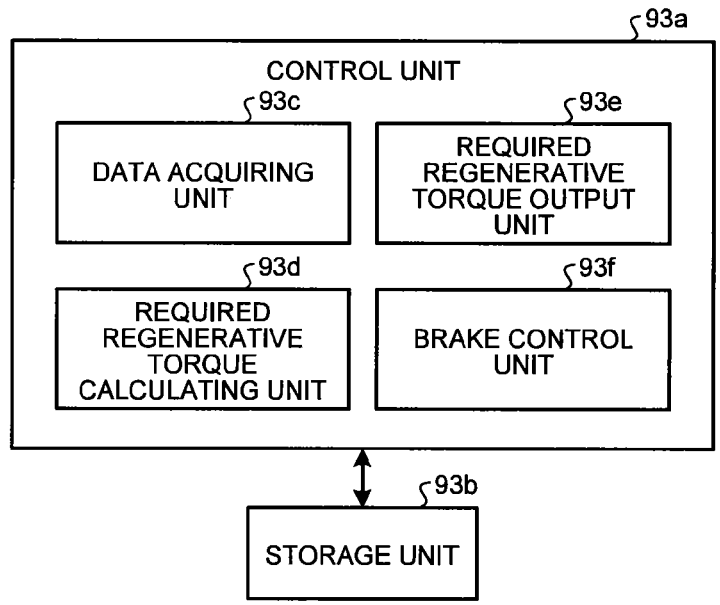
FIG. 9 is a functional block diagram illustrating a part of the control device for a vehicle according to the fourth embodiment.

As illustrated in FIG. 9, the brake unit 93A (the control device, the brake control device) includes the control unit 93a (e.g., a CPU) and a storage unit 93b (e.g., an auxiliary storage). As illustrated in FIG. 9, the control unit 93a can function (operate) as the following components: a data acquiring unit 93c, a required regenerative torque calculating unit 93d, a required regenerative torque output unit 93e, and a brake control unit 93f, for example, through hardware in cooperation with software (computer programs). That is, the computer programs can include modules corresponding to the respective blocks, for example, in the control unit 93a illustrated in FIG. 9. It is noted that the required regenerative torque is a required value (a instruction value, data) of the regenerative torque of the motor generator 3 (the control device 10).

In the control unit 93a, the data acquiring unit 93c acquires at least one piece of data (a parameter) used for arithmetic processing or control by the control unit 93a from the control device 10, for example. The required regenerative torque calculating unit 93d calculates (determines) the required regenerative torque in shifting the gear corresponding to various conditions. The required regenerative torque output unit 93e outputs the calculated required regenerative torque in shifting the gear to the control device 10. The brake control unit 93f controls the components (e.g., the solenoid valve) in the brake unit 93A. The storage unit 93b stores therein the data used for arithmetic processing or control by the control unit 93a and results of the arithmetic processing, for example.

Figure 10:
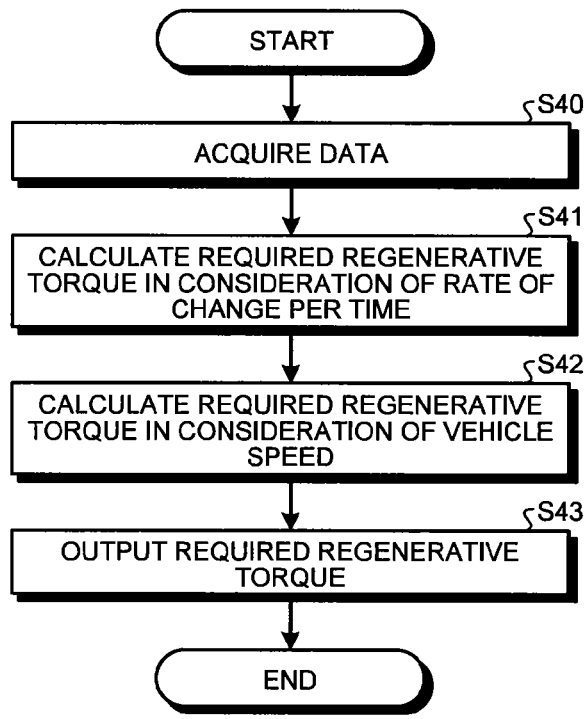
FIG. 10 is a flowchart illustrating a process of calculating and outputting required regenerative torque executed by the control device for a vehicle according to the fourth embodiment.

In the present embodiment, if the gear is shifted during the regeneration executed by the motor generator 3 (shifting the gear position), the control unit 93a calculates the required regenerative torque with the process illustrated in FIG. 10 and outputs the calculated torque. The process from S40 to S43 illustrated in FIG. 10 is repeatedly executed with a certain time interval. In the process in the flowchart illustrated in FIG. 10, for convenience of description, the regenerative torque (the required regenerative torque, actual regenerative torque) is a positive value. It is noted that the actual regenerative torque is an actual value (data) of the regenerative torque.

When calculating and outputting the required regenerative torque, the control unit 93a firstly functions as the data acquiring unit 93c to acquire the data used for calculating (determining) the required regenerative torque (S40). At S40, the control unit 93a can acquire from the control device 10, for example, data representing or corresponding to the following: the actual regenerative torque; the gear position before shifting; the present vehicle speed; and the vehicle speed at the start of shifting. The data representing or corresponding to the vehicle speed corresponds to the detection result of the sensor 63 or a wheel speed sensor (not illustrated), for example.

Subsequently, the control unit 93a functions as the required regenerative torque calculating unit 93d to calculate the required regenerative torque in consideration of the rate of change per time (S41). The response of the braking torque (the regenerative torque) by the motor generator 3 is higher than the response of the braking torque by the brake unit 93A and the brake 95. To solve this problem, the control unit 93a calculates at S41 the required regenerative torque in consideration of the rate of change per time so that the change in the braking torque by the brake unit 93A and the brake 95 can more successfully follow (compensate) the change in the regenerative torque by the motor generator 3. Specifically, the control unit 93a calculates (determines), for example, the smallest value out of the three values (a first value, a second value, and a third value) as the required regenerative torque while increasing the required regenerative torque after automatic gear shifting in the brake-switching control.

The first value is a value of the required regenerative torque (the braking torque) corresponding to an operation input through the operating unit 91. The first value determines the maximum value of the required regenerative torque. The first value may be calculated by the control device 10 and then acquired by the data acquiring unit 93c. Alternatively, the first value may be calculated by the control unit 93a based on a detection result of the sensor 92.

The second value is calculated by adding a certain increment (a first increment) to the value of the required regenerative torque in the previous calculation timing (control timing). The increment is a positive value while control is executed to increase the required regenerative torque. The increment corresponding to the time intervals of the control timing can define the rate of change per time (the gradient of change, the allowable amount of change per unit time) in the required regenerative torque. The increase in the required regenerative torque is limited by the first increment, thereby preventing a sudden change (sudden increase) in the actual regenerative torque.

The third value is calculated by adding a certain increment (a second increment) to the value of the actual regenerative torque in the previous control timing. For some reason, the required regenerative torque cannot follow the actual regenerative torque in spite of the increased actual regenerative torque. If an increase in the required regenerative torque is not limited in this case, the actual regenerative torque may suddenly change (increase) when the issue above is solved. To solve this problem, in the present embodiment, the increase in the required regenerative torque is limited by the second increment. That is, reducing the deviation of the actual regenerative torque from the required regenerative torque can prevent a sudden change (sudden increase) in the actual regenerative torque.

The smallest value is selected out of the above-described first value, second value, and third value as the required regenerative torque. As a result, the value of the required regenerative torque is equal to or smaller than the value calculated by adding the first increment to the value of the required regenerative torque in the previous control timing. That is, at S41, the rate of change per time of the required regenerative torque remains equal to or smaller than a particular value (a first rate of change per time). The particular value (the first rate of change per time) is calculated by dividing the first increment by a time interval of the control timing. This operation can prevent a sudden change (sudden increase) in the actual regenerative torque, resulting in reduction in the fluctuations in the braking torque that is the sum of the regenerative braking torque by the motor generator 3 and the hydraulic braking torque by the brake unit 93A and the brake 95. In the calculation at S41, the second value (the required regenerative torque) increasing in a stepped manner as the time elapses is corrected by the first value or the third value. In the above-described calculation (a stepped addition or increment) at S41, the situation is assumed that the required regenerative torque after automatic gear shifting is increased in the brake-switching control. Alternatively, in inverse operation of what is performed at S41 (a stepped subtraction or decrement) may be executed while decreasing the required regenerative torque before automatic gear shifting in the brake-switching control under a certain condition, for example, the period of time before the start of shifting can be estimated. In this example, the required regenerative torque can be calculated by subtracting the decrement (a positive value) from the value of the required regenerative torque at the previous control timing.

Figure 11:
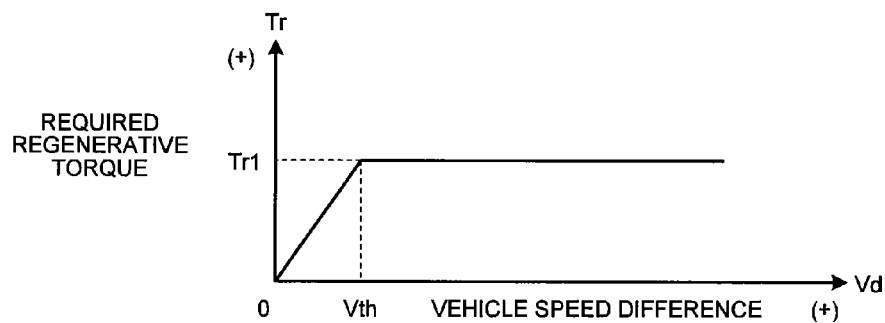
FIG. 11 is a graph illustrating the correlation between vehicle speed and required regenerative torque in the control device for a vehicle according to the fourth embodiment.

Subsequently, the control unit 93a functions as the required regenerative torque calculating unit 93d to calculate the required regenerative torque in consideration of the vehicle speed (the vehicle speed difference) (S42). The control unit 93a calculates at S42 the required regenerative torque in consideration of the vehicle speed so that the change in the braking torque by the brake unit 93A and the brake 95 can more successfully follow (compensate) the change in the regenerative torque by the motor generator 3. Specifically, the control unit 93a calculates, for example, the required regenerative torque corresponding to the vehicle speed difference while decreasing the required regenerative torque before automatic gear shifting or before stopping the vehicle in the brake-switching control. The vehicle speed difference here refers to the difference between the present vehicle speed (at the present control timing) and the vehicle speed at the end of control of reducing the required regenerative torque to stop the regeneration (at the timing that the regenerative torque becomes 0) (an ending vehicle speed, a target vehicle speed). The control unit 93a calculates the required regenerative torque corresponding to the vehicle speed difference based on the correlation, illustrated in FIG. 11, between the vehicle speed difference (represented with the abscissa axis in the graph illustrated in FIG. 11) and the required regenerative torque (represented with the ordinate axis in the graph). The ending vehicle speed varies depending on the gear position. For example, if the gear position is in "1", the ending vehicle speed indicates 0. If the gear position is in "2" or higher, the ending vehicle speed indicates the vehicle speed at the start of shifting. If the ending vehicle speed indicates 0, the present vehicle speed is equal to the vehicle speed difference. As illustrated in FIG. 11, if the vehicle speed difference Vd is equal to or larger than 0 and equal to or smaller than the threshold Vth, the required regenerative torque Tr corresponding to the vehicle speed difference Vd can be obtained with the expression Tr=Tr1/Vth×Vd. With reference to the expression and FIG. 11, it is understood that the required regenerative torque Tr decreases with the decreasing vehicle speed difference, and increases with the increasing vehicle speed difference. If the vehicle speed difference Vd is equal to or larger than the threshold Vth, the required regenerative torque Tr corresponding to the vehicle speed difference Vd can be defined as Tr=Tr1. The control unit 93a gradually reduces the required regenerative torque as the vehicle speed difference Vd approaches 0 associated with the deceleration of the vehicle 1A, in other words, as the present vehicle speed approaches the ending vehicle speed. The control unit 93a thus makes the required regenerative torque 0 before or at starting the automatic gear shifting or stopping the vehicle. This control can reflect the response of the brake unit 93A and the brake 95 on the variation with time of the required regenerative torque Tr by defining the change rate of the required regenerative torque Tr relative to the vehicle speed difference Vd (the gradient in the section of 0≤Vd≤Tr1 in the graph illustrated in FIG. 11, Tr1/Vth). Specifically, the rate of change Tr1/Vth is defined smaller with the decreasing response of the brake unit 93A or the brake 95. The correlation between the vehicle speed difference and the required regenerative torque can be defined for each gear position. The required regenerative torque may be calculated by an expression representing the correlation between the required regenerative torque and the vehicle speed difference. Alternatively, the required regenerative torque may be calculated by a table stored in the storage unit 93b.

Subsequently, the control unit 93a functions as the required regenerative torque output unit 93e to output the calculated (determined) required regenerative torque to the control device 10. The control device 10 controls the power control unit 32 or the motor generator 3 to make the actual regenerative torque achieves the value of the required regenerative torque. Also in the present embodiment, corresponding components are controlled to make the sum of the braking torque due to the regeneration executed by the motor generator 3 and the braking torque by the brake 95 becomes the value of the braking torque corresponding to the operation input through the operating unit 91. That is, the brake control unit 93f (the control unit 93a) controls the brake unit 93A to change the braking torque of the brake 95 depending on the braking torque in response to the operation input and on the calculated required regenerative torque. The above-described calculation and output of the required regenerative torque may be executed by the control device 10 (the control unit 11). In this example, the control device 10 acquires, for example, parameters (data) corresponding to the response of the brake unit 93A and the brake 95 in advance and uses the parameters for the calculation (control).

Figure 12:
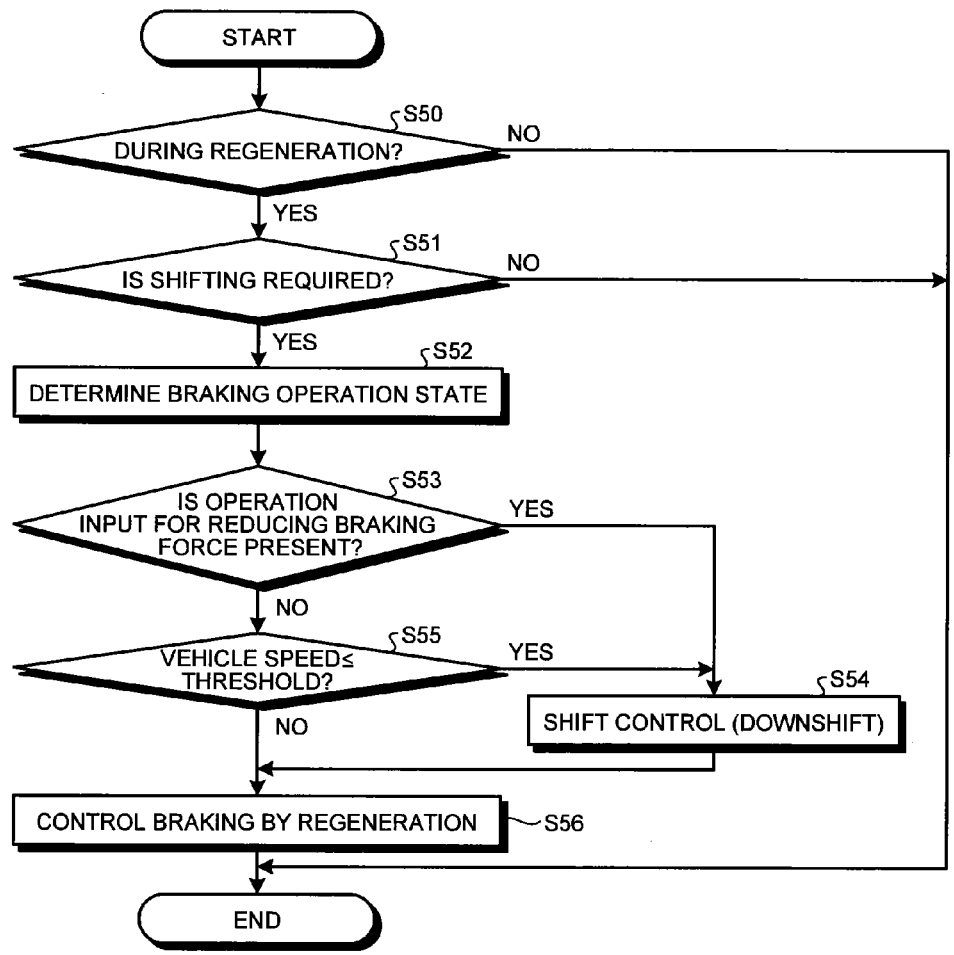
FIG. 12 is a flowchart illustrating a process of control executed by the control device for a vehicle according to the fourth embodiment.

The control unit 11 of the control device 10 executes, as illustrated in FIG. 12, the control process from S52 to S56 if the motor generator 3 is executing regeneration (Yes at S50) and the shifting has been required (Yes at S51). If the motor generator 3 is not executing regeneration (No at S50) and the shifting has not been required (No at S51), the control according to the flowchart illustrated in FIG. 12 is not executed. If Yes is selected at S51, the control unit 11 determines the braking operation state in the operating unit 91 (S52). If no operation input is received for reducing the braking force at S52 (No at S53), and the vehicle speed is larger than the corresponding threshold, in the same manner as S36 illustrated in FIG. 7 (No at S55), the control unit 11 outputs a control signal to the components so that regeneration by the motor generator 3 brakes the vehicle 1 while retaining the gear position, in the same manner as S34 illustrated in FIG. 7 (S56). By contrast, if any operation input is received for reducing the braking force (Yes at S53), or the vehicle speed is equal to or smaller than the corresponding threshold (Yes at S55), in the same manner as S33 illustrated in FIG. 7, the control unit 11 outputs a control signal to the components (S54) so as to lower the gear position, thereby executing the braking control through the regeneration (S56). In response to the processing at S54 and S56, the control unit 93a or the control device 10 executes the process according to the flowchart illustrated in FIG. 10. According to the present embodiment, the above-described control achieves what is called downshift if any operation input is received for reducing the braking force or the vehicle speed is equal to or smaller than the corresponding threshold. The downshift facilitates reacceleration. That is, also according to the present embodiment, the control is likely to prevent difficulty in acceleration caused by a high gear position when the vehicle 1A starts acceleration. In addition, according to the present embodiment, sudden changes in the deceleration can be prevented.

As described above, in the present embodiment, the control unit 93a (the drive control unit) executes control so as to vary the rate of change per time of the regenerative braking torque by the motor generator 3 within the range of the value equal to or smaller than the first increment (a particular value). This control allows, for example, the first increment to prevent sudden changes in the regenerative braking torque. Accordingly, the change in the braking torque by the brake unit 93A and the brake 95 having low response can more successfully follow the change in the braking torque through regeneration by the motor generator 3 having higher response. Sudden changes in the deceleration can be therefore prevented, for example.

In the present embodiment, the control unit 93a (the drive control unit) controls the required regenerative torque (the regenerative braking torque) to decrease as the time elapses until the motor generator 3 stops the regeneration. During the decrease, the control unit 93a controls the required regenerative torque to decrease depending on the vehicle speed difference between the present vehicle speed and the ending vehicle speed at the end of the deceleration control (at the time of stopping the regeneration). This control can prevent sudden changes in the actual regenerative torque by defining the required regenerative torque corresponding to the vehicle speed difference, for example. In this manner, the change in the braking torque by the brake unit 93A and the brake 95 having low response can more successfully follow the change in the braking torque through regeneration by the motor generator 3 having higher response. Sudden changes in the deceleration can be therefore prevented, for example.

In the present embodiment, the control unit 93a (the first control unit) is provided to the brake unit 93A. This configuration allows the response or other characteristics of the brake unit 93A or the brake 95 to be reflected on the control of the regenerative braking torque more readily or more accurately, for example.

In the present embodiment, the control device 10 (the drive control unit) executes control so as to shift the gear position to a lower one if any operation input is received for reducing the braking force on the vehicle 1A. This control is likely to prevent difficulty in acceleration caused by a high gear position when the vehicle 1A starts acceleration, for example. In addition, sudden changes in the deceleration can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for a vehicle that controls: a motor generator that generates torque for driving the vehicle and executes regeneration in which kinetic energy of the vehicle is converted into electrical energy, a multi-speed transmission that transfers torque of the motor generator with a selected gear ratio from a plurality of available gear ratios toward a wheel, and a fluid pressure brake that brakes the vehicle, the control device for the vehicle comprising:
   a first acquiring unit that acquires a speed or speed variation of the vehicle;
   a second acquiring unit that acquires an operation input for accelerating or decelerating the vehicle;
   a comparing unit that predicts deceleration of the vehicle and compares a first value with a second value, the first value being the kinetic energy regenerated in a case where the selected gear ratio in the transmission is retained in the deceleration of the vehicle, the second value being a sum of kinetic energy lost in shifting the selected gear ratio to a lower gear ratio and kinetic energy regenerated after shifting to the lower gear ratio; and a drive control unit that controls an operation of the motor generator, shifting between the plurality of gear ratios in the multi-speed transmission, and an operation of the brake, wherein the drive control unit executes control to retain the selected gear ratio of the plurality of gear ratios in the multi-speed transmission during the deceleration of the vehicle and regeneration executed by the motor generator in a case where the first value is equal to or larger than the second value, and the drive control unit executes control to shift the selected gear ratio to the lower gear ratio in spite of the deceleration of the vehicle and the regeneration executed by the motor generator in a case where the first value is smaller than the second value.

2. The control device for the vehicle according to claim 1, wherein the drive control unit executes control to shift the selected gear ratio to the lower gear ratio in a case where the speed of the vehicle is reduced to a value smaller than a certain threshold while the selected gear ratio is retained during the deceleration of the vehicle and the regeneration executed by the motor generator.

3. The control device for the vehicle according to claim 1, wherein the drive control unit executes control to shift the selected gear ratio to the lower gear ratio in a case where an operation input for starting the accelerating the vehicle or an operation input for ending braking the vehicle is acquired while the selected gear ratio is retained during the deceleration of the vehicle and the regeneration executed by the motor generator.

4. The control device for the vehicle according to claim 2, wherein the drive control unit executes control to shift the selected gear ratio to the lower gear ratio while the regeneration executed by the motor generator is stopped by controlling the motor generator to stop the regeneration and controlling the brake to start braking.

5. The control device for the vehicle according to claim 3, wherein the drive control unit executes control to shift the selected gear ratio to the lower gear ratio while the regeneration executed by the motor generator is stopped by controlling the motor generator to stop the regeneration and controlling the brake to start braking.

6. The control device for the vehicle according to claim 1, wherein the drive control unit executes control to shift the selected gear ratio to the lower gear ratio while the regeneration executed by the motor generator is stopped by controlling the motor generator to stop the regeneration and controlling the brake to start braking.

7. The control device for the vehicle according to claim 4, wherein the drive control unit executes control of regenerative braking torque by the motor generator so as to vary a rate of change per time of the regenerative braking torque by the motor generator within a range of a value equal to or smaller than a certain value.

8. The control device for the vehicle according to claim 4, wherein the drive control unit controls a regenerative braking torque to decrease as the time elapses until the motor generator stops the regeneration and controls the regenerative braking torque to decrease depending on a vehicle speed difference between a present vehicle speed and a vehicle speed at stopping the regeneration during the decrease of the regenerative braking torque.

9. The control device for the vehicle according to claim 7, wherein a first control unit in the drive control unit is provided in a brake unit, the first control unit controlling the regenerative braking torque by the motor generator.

10. The control device for the vehicle according to claim 8, wherein a first control unit in the drive control unit is provided in a brake unit, the first control unit controlling regenerative braking torque.

11. The control device for the vehicle according to claim 1, wherein the drive control unit executes control to shift the selected gear ratio to the lower gear ratio in a case where an operation input for ending the accelerating the vehicle or an operation input for starting braking the vehicle is acquired.

12. The control device for the vehicle according to claim 1, wherein the drive control unit executes control to shift the selected gear ratio to the lower gear ratio in a case where an operation input for reducing a braking force of the vehicle is acquired.

13. A drive system for a vehicle, the drive system comprising:

a motor generator that generates torque for driving the vehicle and executes regeneration in which kinetic energy of the vehicle is converted into electrical energy;

a multi-speed transmission that transfers rotation of the motor generator with a selected gear ratio from a plurality of available gear ratios toward a wheel;

a fluid pressure brake that brakes the vehicle; and a control device that controls an operation of the motor generator, shifting between the plurality of gear ratios in the multi-speed transmission, and an operation of the brake, the control device comprising:

a first acquiring unit that acquires a speed or speed variation of the vehicle;

a second acquiring unit that acquires an operation input for accelerating or decelerating the vehicle;

a comparing unit that predicts deceleration of the vehicle and compares a first value with a second value, the first value being the kinetic energy regenerated in a case where the selected gear ratio in the transmission is retained in the deceleration of the vehicle, the second value being a sum of kinetic energy lost in shifting the selected gear ratio to a lower gear ratio and kinetic energy regenerated after shifting to the lower gear ratio; and a drive control unit that executes control to:

retain the selected gear ratio of the plurality of gear ratios in the multi-speed transmission during deceleration of the vehicle and regeneration executed by the motor generator in a case where the first value is equal to or larger than the second value, and shift the selected gear ratio to a lower gear ratio in spite of the deceleration of the vehicle and the regeneration executed by the motor generator in a case where the first value is smaller than the second value.

* * * * *